Patented Dec. 5, 1922.

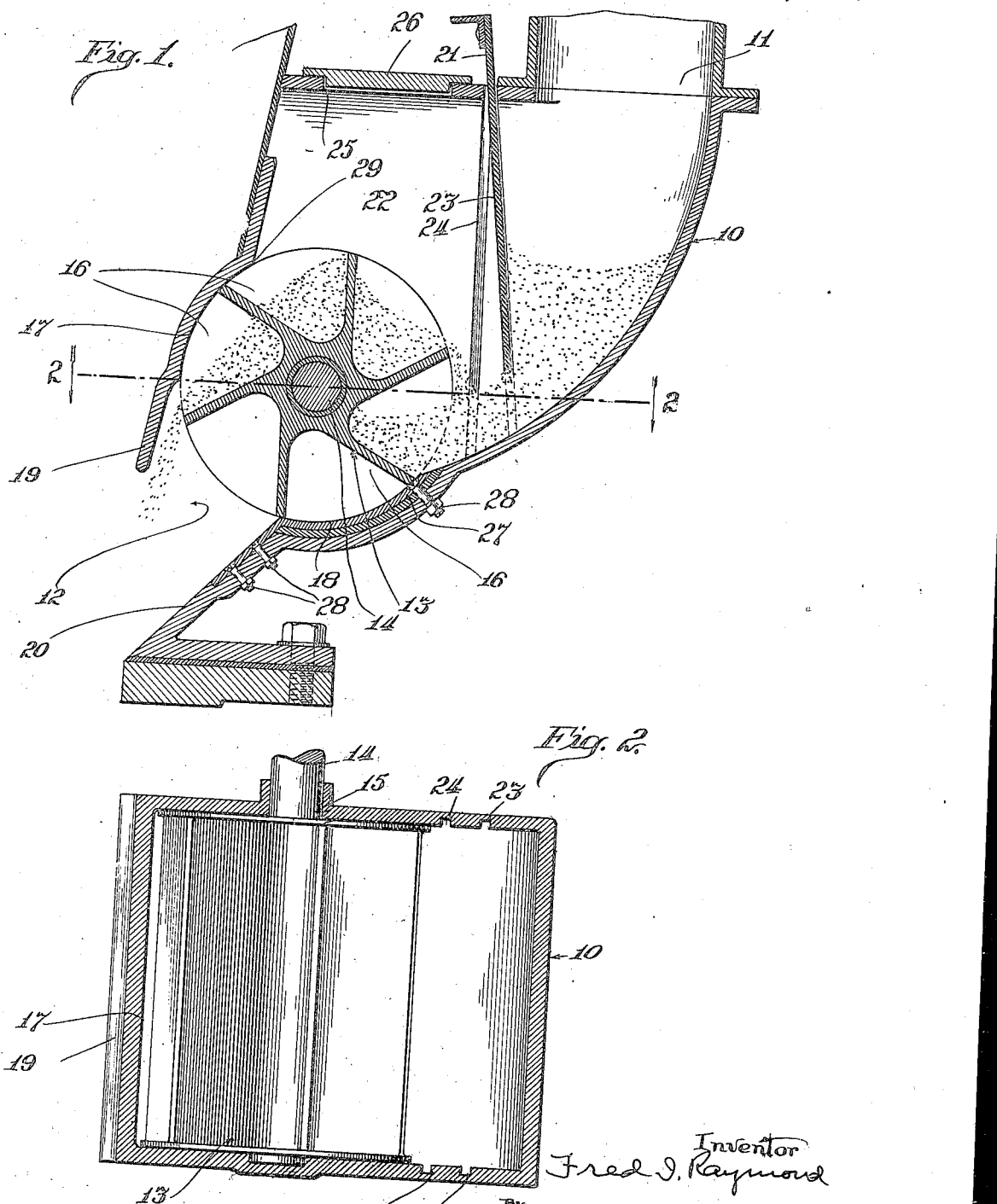

1,437,863

UNITED STATES PATENT OFFICE.

FRED I. RAYMOND, OF EVANSTON, ILLINOIS, ASSIGNOR TO RAYMOND BROTHERS IMPACT PULVERIZER COMPANY, OF CHICAGO, ILLINOIS, A CORPORATION OF ILLINOIS.

FEEDING DEVICE.

Application filed August 10, 1920. Serial No. 402,545.

*To all whom it may concern:*

Be it known that I, FRED I. RAYMOND, citizen of the United States, residing at 715 Sheridan Road, Evanston, in the county of Cook and State of Illinois, have invented certain new and useful Improvements in Feeding Devices, of which the following is a specification.

This invention relates to feeding devices and particularly to a feeding device or mechanism for feeding substances, such as granular material, in definite quantities and at a given rate.

The invention has for one of its objects to provide a feeding device of generally improved construction and one which will not wear so readily under the action of the material handled thereby.

A further object is to provide a feeding device which will not clog during operation, or while the same is idle.

A still further object is to provide a feeding device which will not injure or crush materials handled thereby.

A further object is to provide a feeding device which will not allow air or other gas to pass therethrough either into or from the mill. This is of particular advantage when the feeder is used with a mill in which the pressure in the grinding chamber is above or below the pressure into which the material is delivered, for example, when the grinding chamber is at sub-atmospheric pressure.

The invention consists in the novel constructions, combinations and arrangements, to be hereinafter described and claimed for carrying out the above stated objects, and such other objects as will appear from the following description.

The invention is illustrated in a preferred embodiment in the accompanying drawing, in which—

Fig. 1 is a vertical section taken transversely of the feed roll; and

Fig. 2 is a plan section taken on the line 2—2 of Fig. 1.

Like characters of reference designate like parts in the several figures of the drawing.

The feeding mechanism comprises a casing 10 having an inlet duct 11 for material and a discharge opening 12. Across the casing is disposed a rotary feeder 13 having its axis preferably horizontal and supported for rotation by the shaft 14 extending at least on one side out of the casing, as shown at 15 in Fig. 2. The feeder is of any suitable design and size and is provided with a plurality of material receiving pockets 16 of a size and shape depending somewhat on the character and quantity of material to be handled. The top and bottom walls of the casing adjacent the feeder are preferably curved on arcs of equal radius from the center of rotation of the feeder, as shown at 17 and 18 respectively, so as to properly close the passage and prevent the leakage of material and air between the feeder and the walls of the casing. Sufficient clearance is allowed between the feeder and the casing so as to prevent rubbing when the feeder rotates. The seal between the feeder and walls 17 and 18 is effective for all positions of the feeder because the angular distance between the edges of each of said walls is greater than the corresponding dimension of the pockets. If desired the upper edge of the opening 12 may be provided with a flange 19 to prevent the scattering of material and to direct the same downwardly and the lower edge of the opening 12 may be provided with an inclined surface 20 for suitably directing the flow of material.

Disposed across the passage in the casing is a vertically adjustable gate or valve 21 for regulating the delivery of the material to the feeder and for excluding the same from the space 22 above the feeder. A series of guide slots 23 and 24 are preferably provided in the casing for the gate 21, and the same is adapted to operate in either of the slots depending upon the character of material handled to constrict the delivery orifice of the inlet duct 11. It is obvious that the feed gate may be employed in connection with other forms of feeding devices, its function being to regulate the access of the material to the feeding device and to prevent clogging.

An inspection opening 25 is formed in the casing above the feeder and adjacent thereto, so that any material which interferes with the operation of the feeder may be easily removed. The inspection opening 25 is provided with a suitable cover 26.

A curved wear plate 27 conforming to the periphery of the feeder is preferably provided in the lower portion of the casing adjacent the feeder, the wear plate forming part of wall 18 and being adapted to be removed and replaced, if necessary, a plurality of bolts 28 serving to hold the same in place.

*Operation.*—The feeder is rotated in a counter-clockwise direction, as shown, so as to constitute an overrunning feeder. That is, the material fed into the pocket thereof is carried over the device instead of under it. The adjustable feed gate 21 is so positioned as to deliver the material to the feeder from what may be termed as the leading edge of the passage. The feed gate prevents the entry of the material to the space above the feeder, and thus prevents the clogging of the same by hard particles of material which might otherwise lodge between the feeder and the opposite edge 29 of the passage. The feed gate also permits a stream of material of limited depth only to approach the feeder and thus prevents the complete filling of the pocket 16 thereof. This prevents friction of the material against the upper curved surface 17, and reduces wear. The inspection opening 25 permits the removal of any particles of material which interfere with the operation of the apparatus.

It has been a serious objection of certain types of feeding mechanism that when they were idle the material would pack so tightly against the rotary feeders by reason of the vibration of the machine as to prevent the starting thereof. In the form of feeding mechanism herein disclosed, the feed gate allows the access of the material to a small portion only of the rotary feeder and accordingly no packing of the material around the feed roll can result from vibration or similar causes. When the quantity of material beyond the gate opening piles up so that the angle at repose of the material is reached, further flow through the gate opening is checked until the further removal of material by the feeding device lowers the angle of repose. Moreover, the over-running type of device involves less wear due to friction of material against the wear plate 27 than is the case with machines in which the feeder rotates in the opposite direction. Materials which it is essential should not be injured in the feeder may be fed by this type of mechanism without being crushed between the feeder and the wear plate 27, inasmuch as the feeder is an over-running wheel and the pockets 16 are never full.

The feeder is driven by suitable mechanism, forming no part of this invention, for rotating it at variable speeds according to the rate of feed desired.

This feeding mechanism is adapted for use in pulverizing machinery, mixers, and other machines where it is desired to feed material in definite quantities.

By my improvement, I have provided a construction comprising the sloping lower face of the casing 10, with the feeding device mounted at one side thereof in position to receive materials passing downwardly along said sloping face, in which construction the gate 21 is adapted by restricting the depth of the stream of materials to prevent the complete filling of the pockets as they are presented successively in receiving position, or is adapted by this same restriction of depth of the stream of materials adjacent to the mouths of the pockets at the right in Fig. 1 to cause any surplus of materials in excess of the predetermined desired amount to flow backwardly from the pockets as they rise on the receiving or filling side of the feeding roll prior to the dumping operation on the reverse side. Inasmuch as this construction is very simple and can be produced at a comparatively small cost of manufacture, and inasmuch as it is at the same time very effective for regular feeding and for preventing clogging of the feeding device, I consider such improvement to be of very considerable importance and desire to have my claims construed broadly for covering my novel construction.

It will be obvious that the quantity of material received in each pocket of the feeder is not materially affected by the speed at which the feeder is rotated (at least within certain limits) but depends primarily upon the angle of repose of the material in the inlet duct which will vary with different materials, of course, for which reason the delivery orifice of the duct is capable of variation, preferably through adjustment of the valve 23. The position of the inlet duct at one side of the feeder, the direction of rotation of which is upward from said duct, makes it impossible with any intended adjustment of the valve to have the pockets fill up completely regardless of how slowly or how rapidly the feeder may be revolved. With a feeding device of this class the quantity of material passed will necessarily depend upon the requirement of the particular mill, or other mechanism, with which the device is used, having in view the character of the material treated. The quantity required to be passed may be small or large per unit of time and this can be taken care of by varying the speed of rotation of the feeder or the position of the gate valve or both, but even when the feeder is rotated very slowly the pockets will not fill so that the danger of clogging is obviated, wear on the parts is minimized and the feeder can be made, and will remain for a considerable period of time, substantially air tight, when that is desirable. By having the feeding duct at one side of the feeder, should the mechanism become clogged by some large piece of material or article, the obstruction can be easily removed through opening 25 without dismantling the apparatus.

I claim:

1. A feeding mechanism comprising a casing having an inlet, an outlet, and an inclined bottom wall below said inlet, a rotatable pocket feeder in said casing discharging through said outlet, and a slide valve for controlling the depth of material flowing to said feeding mechanism, said casing having a plurality of guideways in either of which said valve may be adjusted and operated.

2. In feeding mechanism, a rotary feeder provided with pockets, means for delivering material to said feeder on the side thereof which moves upwardly in a stream, the bottom of which is below the center of rotation of the feeder, and means limiting the amount of material fed so that it is insufficient to fill the pockets.

3. In feeding mechanism, a rotary feeder provided with pockets and means for delivering material to said feeder, on the side thereof which moves upwardly, in a stream, the bottom of which is below the center of rotation of the feeder and which is insufficient in depth to fill the pockets and means for varying the depth of the stream of material fed to said pockets.

4. In feeding mechanism, a rotary feeder provided with pockets, a casing in which said feeder operates provided with an inlet duct at the side of the feeder that moves upwardly, the bottom of which duct directly discharges the fed material into said pockets and is below the center of rotation of the feeder and an outlet on the other side, and means for restricting the delivery orifice of said duct to limit the inflow of material to a quantity insufficient to fill the pockets.

5. In feeding mechanism, a rotary feeder provided with pockets, a casing in which said feeder operates provided with an inlet duct at the side of the feeder that moves upwardly, the bottom of which duct is below the center of rotation of the feeder and an outlet on the other side, and means for restricting the delivery orifice of said duct to limit the inflow of material to a quantity insufficient to fill the pockets, said casing being formed with a cylindrically curved surface below the inlet duct in sealing proximity to which the feeder rotates.

6. In feeding mechanism, a rotary feeder provided with pockets, a casing in which said feeder operates provided with an inlet duct at the side of the feeder that moves upwardly, the bottom of which duct is below the center of rotation of the feeder and an outlet on the other side, and means for restricting the delivery orifice of said duct to limit the inflow of material to a quantity insufficient to fill the pockets, said casing being formed with cylindrically curved surfaces one below the inlet duct and the other above the outlet in sealing proximity to which the feeder rotates.

7. In feeding mechanism, a rotary feeder provided with a plurality of radially arranged pockets, a casing in which the feeder operates provided with an inlet duct at the side of the feeder that moves upwardly, the bottom of which duct is below the center of rotation of the feeder and an outlet on the other side, and means for restricting the delivery orifice of said duct to limit the inflow of material to a quantity insufficient to fill the pockets.

8. In feeding mechanism, a rotary feeder provided with pockets, a casing in which said feeder operates with an inlet duct at the side of the feeder that moves upwardly, the bottom of which duct directly discharges the fed material into said pockets and is below the center of rotation of the feeder and an outlet duct on the other side, and an adjustable valve for restricting the delivery orifice of said duct to limit the inflow of said material to a quantity insufficient to fill said pockets.

9. In feeding mechanism, the combination of a rotary feeder formed with radially arranged pockets, a casing in which said feeder operates comprising two oppositely arranged, cylindrically curved surfaces in sealing proximity to which the feeder rotates, an inlet duct at the side of the feeder that moves upwardly said duct having a sloping bottom which meets the upper edge of one of said cylindrical surfaces at a point below the center of rotation of said feeder, and an adjustable valve in said duct to limit the inflow of said material to a quantity insufficient to fill the pockets.

10. In feeding mechanism, the combination of a rotary feeder formed with radially arranged pockets, a casing comprising two oppositely arranged cylindrically curved surfaces in sealing proximity to which the feeder rotates, an inlet duct at the side of the feeder that moves upwardly said duct having a sloping bottom surface which meets the upper edge of one of said cylindrical surfaces at a point below the center of rotation of said feeder and means for restricting the delivery orifice of said duct to limit the inflow of material to a quantity insufficient to fill the pockets.

FRED I. RAYMOND.